(12) United States Patent
Akita et al.

(10) Patent No.: US 6,610,444 B2
(45) Date of Patent: Aug. 26, 2003

(54) SECONDARY CELL WITH NON-ROTATABLE TERMINAL MEMBER

(75) Inventors: Hiroyuki Akita, Neyagawa (JP); Naoya Nakanishi, Tondabayashi (JP); Toshiyuki Nohma, Hirakata (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 22 days.

(21) Appl. No.: 09/963,548

(22) Filed: Sep. 27, 2001

(65) Prior Publication Data

US 2002/0039679 A1 Apr. 4, 2002

(30) Foreign Application Priority Data

Sep. 29, 2000 (JP) .......................................... 2000-299374

(51) Int. Cl.⁷ .............................. H01M 2/30; H01M 2/08
(52) U.S. Cl. ........................ 429/181; 429/178; 429/174; 429/183
(58) Field of Search .................................. 429/178, 181, 429/182, 183, 174

(56) References Cited

U.S. PATENT DOCUMENTS

| 5,849,431 A | 12/1998 | Kita et al. ................... 429/164 |
| 6,071,638 A * | 6/2000 | Fradin .................... 429/178 X |
| 6,139,986 A * | 10/2000 | Kurokawa et al. ...... 429/183 X |
| 6,399,237 B1 * | 6/2002 | Souliac et al. .......... 429/183 X |

FOREIGN PATENT DOCUMENTS

| JP | 09-092238 A | 4/1997 |
| JP | 2000-311664 A | 11/2000 |

* cited by examiner

Primary Examiner—John S. Maples
(74) Attorney, Agent, or Firm—Kubovcik & Kubovcik (57) ABSTRACT

In a secondary cell comprising an electrode unit enclosed in a cell can and adapted to deliver electric power generated by the electrode unit via electrode terminal assemblies, each electrode terminal assembly comprises an electrode terminal member extending through a center hole in a lid of the can, an insulating seal member provided in the center hole of the lid around a screw shank of the electrode terminal member, and a nut screwed on the screw shank of the electrode terminal member projecting outward from can. The insulating seal member is in engagement with the can and the flange of the electrode terminal member and nonrotatable relative to the cell can and the flange, whereby the electrode terminal member is prevented from rotating with the nut when the electrode terminal assembly is fixed to the lid.

10 Claims, 7 Drawing Sheets

SECONDARY CELL WITH NON-ROTATABLE TERMINAL MEMBER

FIELD OF THE INVENTION

The present invention relates to secondary cells which comprise a cell can and an electrode unit accommodated in the cell can and serving as a secondary cell element and which are adapted to deliver electric power generated by the electrode unit from a pair of electrode terminals on the can to the outside.

BACKGROUND OF THE INVENTION

Figure 5:
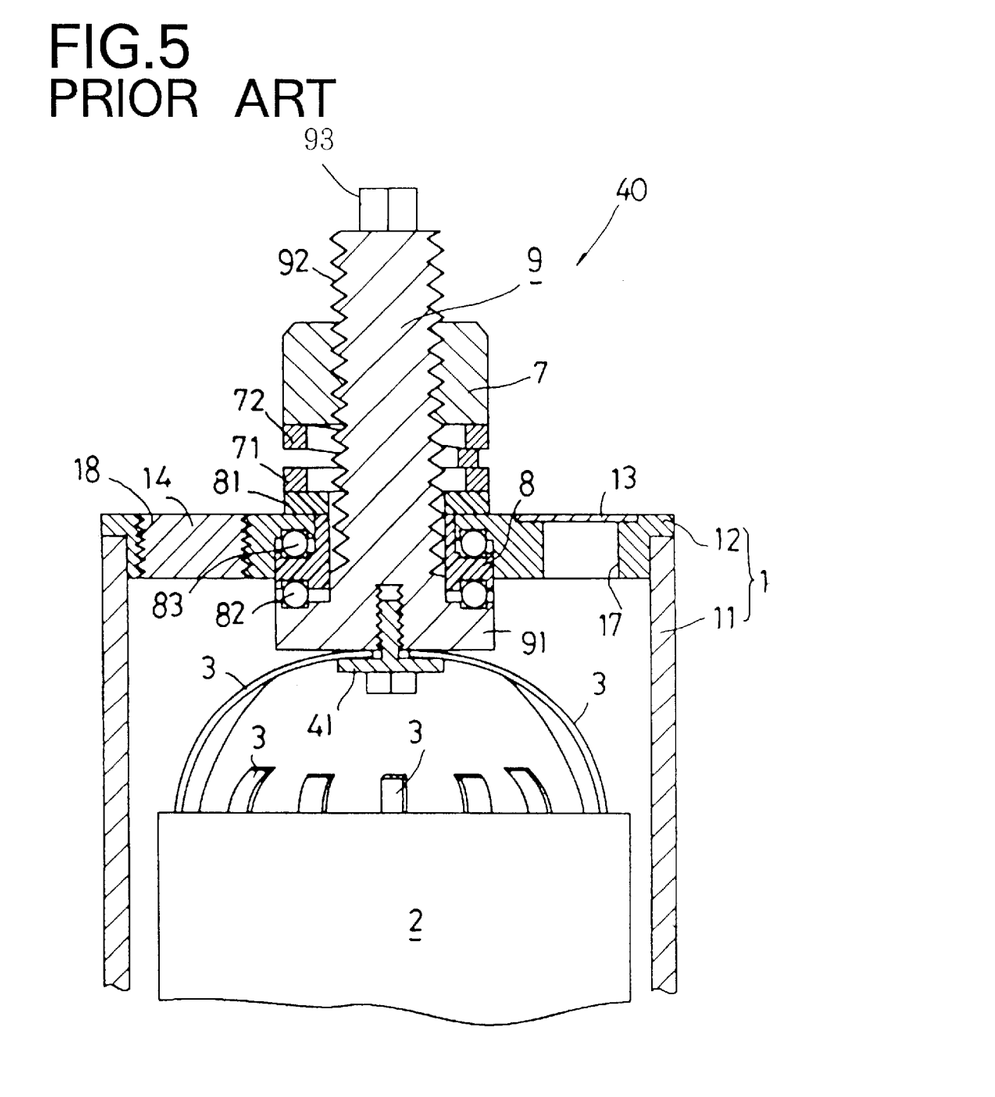
FIG. 5 is a fragmentary sectional view of a cylindrical lithium ion secondary cell of the prior art.

In recent years, attention has been directed to lithium ion secondary cells or batteries having a high energy density for use as power sources for portable electronic devices, electric vehicles, etc. Cylindrical lithium ion secondary cells of relatively large capacity, for example, for use in electric vehicles comprise, as shown in FIG. 5, a cylindrical cell can 1 having a cylinder 11 and lids 12, 12 fixed to the respective ends of the cylinder, and a rolled-up electrode unit 2 encased in the can 1.

A pair of positive and negative electrode terminal assemblies 40, 40 are attached to the lids 12, 12, respectively. The two electrodes of the rolled-up electrode unit 2 are connected to the terminal assemblies 40, 40, whereby the electric power generated by the electrode unit 2 can be delivered to the outside from the pair of terminal assemblies 40, 40. Each lid 12 has a screw plug 14 screwed in and closing a threaded bore 18 for pouring an electrolyte into the cell can 1 therethrough and a gas vent valve 13 closing a gas vent 17.

Figure 6:
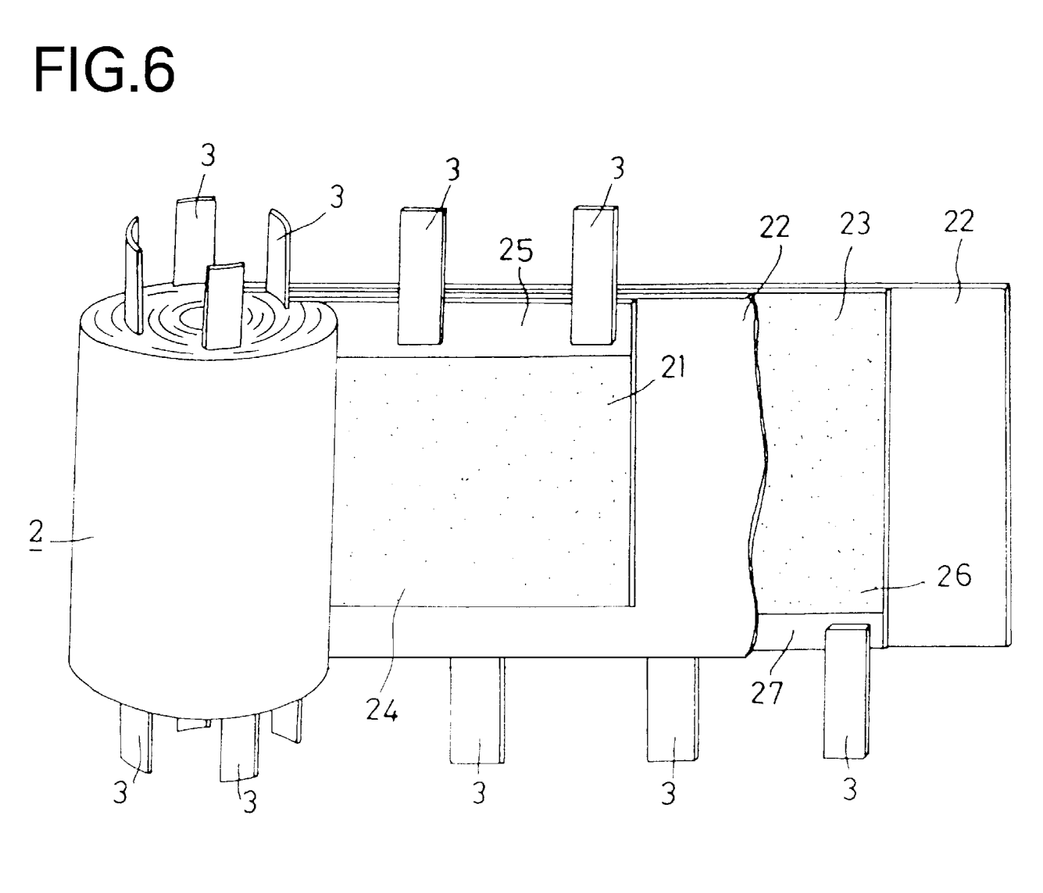
FIG. 6 is a perspective view partly in development and showing a rolled-up electrode unit.

As shown in FIG. 6, the rolled-up electrode unit 2 comprises a positive electrode 21 and a negative electrode 23 which are each in the form of a strip and which are rolled up into a spiral form with a striplike separator 22 interposed between the electrodes. The positive electrode 21 comprises a striplike current collector 25 in the form of aluminum foil and coated over opposite surfaces thereof with a positive electrode active substance 24 comprising a lithium composite oxide. The negative electrode 23 comprises a striplike current collector 27 in the form of copper foil and coated over opposite surfaces thereof with a negative electrode active substance 26 containing a carbon material. The separator 22 is impregnated with a nonaqueous electrolyte.

The positive electrode 21 has an uncoated portion having no active substance 24 applied thereto, and base ends of current collector tabs 3 are joined to the uncoated portion. Similarly, the negative electrode 23 has an uncoated portion having no active substance 26 applied thereto, and base ends of current collector tabs 3 are joined to the uncoated portion.

With reference to FIG. 5, the current collector tabs 3 of the same polarity have outer ends connected to one electrode terminal assembly 40. For the sake of convenience, FIG. 5 shows only some of the electrode tabs as connected at their outer ends to the terminal assembly 40, with the connection of the other tab outer ends to the assembly 40 omitted from the illustration.

The electrode terminal assembly 40 comprises an electrode terminal member 9 extending through and attached to the lid 12 of the cell can 1. The terminal member 9 comprises a screw shank 92 extending through a hole in the lid 12, a flange 91 formed at a base end of the shank 92 and projecting into the can 1, and a square projection 93 at an outer end of the shank.

A tubular insulating seal member 8 is fitted in the hole of the lid 12, while a disklike insulating seal member 81 is provided on the surface of the lid 12. O-rings 82, 83 are interposed between opposed faces of the tubular insulating seal member 8 and the flange 91 of the terminal member 9 and between opposed faces of the tubular insulating seal member 8 and the lid 12. Thus, electrical insulation and a seal are provided between the lid 12 and the terminal member 9. The insulating seal members 8, 81 are made of polypropylene.

A washer 71 and a spring washer 72 are provided around the shank 92 of the electrode terminal member 9 from outside the lid 12, and a nut 7 is screwed on the shank 92. The seal members 8, 81 and the O-rings 82 83 are held between the flange 91 of the terminal member 9 and the washer 71 by tightening up the nut 7 to produce an enhanced sealing effect. A tab connecting screw member 41 is screwed in the flange 91 of the terminal member 9. The outer ends of the current collector tabs 3 extending from the rolled-up electrode unit 2 are held between the flange 91 and the screw member 41.

In assembling the conventional cylindrical secondary cell described, the electrode terminal assembly 40 is mounted on the lid 12 of the cell can 1, and the nut 7 is thereafter screwed on the terminal member 9. However, this procedure involves a likelihood that the terminal member 9 will rotate with the rotation of the nut 7. It is therefore impossible to tighten up the nut 7 with full strength, entailing the problem of increased contact resistance.

In attaching the electrode terminal assembly 40 to the lid 12 before the lid 12 is fixed to the cylinder 11, the flange 91 of the terminal member 9 can be held against rotation with a tool and thereby prevented from rotating with the nut 7, whereby the damage to the current collector tabs 3 is avoidable. For example, with cylindrical secondary cells for use in electric vehicles, however, the nut 7 is likely to become loosened due to an influence of vibration. Since the nut 7 then needs to be tightened up to a greater extent, there arises the problem that the terminal member 9 will rotate with the nut 7 similarly.

Accordingly, a secondary cell is proposed wherein the electrode terminal assembly and the lid are fixed to each other with a rotation preventing pin [JP-B No. 9-92238 (1997)], whereas the proposal additionally requires an insulating member for electrically insulating the pin from the terminal assembly, giving rise to the problem of increasing the number of components. Further since there is a need to weld the pin and the lid to each other, another problem is encountered in that an increased number of manufacturing steps entails a higher cost.

SUMMARY OF THE INVENTION

An object of the present invention is to provide a secondary cell wherein an electrode terminal member can be prevented from rotating with another member when an electrode terminal assembly is fixed to a lid without the likelihood of increasing the number of components or the number of manufacturing steps.

The present invention provides a secondary cell which comprises an electrode unit 2 enclosed in a cell can 1 and serving as a cell element and which is adapted to deliver electric power generated by the electrode unit 2 to the outside via a pair of electrode terminal portions. At least one of the electrode terminal portions is provided by an electrode terminal assembly 4 attached to the cell can 1. The electrode terminal assembly 4 comprises:

an electrode terminal member 5 extending through a center hole 19 formed in the cell can 1 and having a flange 51 projecting into the cell can 1 and a screw shank 52 projecting outward from the cell can 1, an insulating seal member 6 provided in the center hole 19 of the cell can 1 around the screw shank 52 of the electrode terminal member 5 for providing electrical insulation and a seal between the cell can 1 and the electrode terminal member 5, and a nut 7 screwed on the screw shank 52 of the electrode terminal member 5 from outside the cell can 1, the insulating seal member 6 being in engagement with the cell can 1 and the flange 51 of the electrode terminal member 5 and nonrotatable relative to the cell can and the flange.

With the electrode terminal assembly 4 attached to the cell can 1 in providing the secondary cell of the invention, the nut 7 is screwed on the screw shank 52 of the electrode terminal member 5 by rotating the nut 7, whereby the insulating seal member 6 is clamped between the flange 51 of the electrode terminal member 5 and the nut 7. The terminal assembly 4 is therefore fixed to the cell can 1, and the insulating seal member 6 produces a satisfactory sealing effect.

In rotating the nut 7, the torque on the nut 7 is delivered to and received by the terminal member 5. Because the flange 51 of the terminal member 5 is in engagement with the seal member 6 and nonrotatable relative thereto, and further because the seal member 6 is engagement with the cell can 1 and nonrotatable relative thereto, the torque acting on the terminal member 5 is received by the cell can 1. The terminal member 5 is therefore unlikely to rotate with the nut 7.

Since there is no need to use any special member for preventing the rotation of the electrode terminal member 5, there is no increase in the number of components, and the electrode terminal assembly 4 is simple in construction. Moreover, the insulating seal member 6 can be integrally molded from resin easily like the conventional insulating seal member, while the present cell can be assembled by the same number of steps as in the prior art and is easy to produce.

Stated more specifically, the engaging portions of the insulating seal member 6 and each of the cell can 1 and the flange 51 of the electrode terminal member 5 are provided with a pair of engaging faces in engagement with each other nonrotatably. With this construction, three members conventionally in use, i.e., the cell can 1, electrode terminal member 5 and insulating seal member 6, are given a structure for preventing the rotation of the terminal member 5, so that the present invention can be embodied using the same components as in the prior art.

Further stated more specifically, the insulating seal member 6 is provided with a center bore 64 having the screw shank 52 of the electrode terminal member 5 inserted therethrough, and has two peripheral walls formed around the center bore 64 and each varying in radial distance from a center of the center bore 64 along the direction of periphery of the wall, the cell can 1 having a peripheral wall in engagement with one of the peripheral walls of the insulating seal member 6 nonrotatably relative thereto, the flange 51 of the electrode terminal member 5 having a peripheral wall in engagement with the other peripheral wall of the insulating seal member 6 nonrotatably relative thereto. With this specific construction, one of the peripheral walls of the insulating seal member 6 and the peripheral wall of the cell can 1 provide a pair of engaging faces which are nonrotatable relative to each other, and the other peripheral wall of the seal member 6 and the peripheral wall of flange 51 of the terminal member 5 provide another pair of engaging faces which are nonrotatable relative to each other.

Further stated more specifically, the insulating seal member 6 comprises a plate body 60, and the plate body 60 has an outer peripheral wall provided with at least one corner portion formed by the intersection of a plane with another plane, the outer peripheral wall providing one of said two peripheral walls of the seal member 6. The corner portion formed on the plate body 60 of the seal member 6 is then effectively in engagement with the peripheral wall of the cell can 1, whereby the seal member 6 is reliably prevented from rotating relative to the cell can 1. Further because the two peripheral walls of the seal member 6 can be spaced apart by an increased distance, the seal member 6 can be given an increased strength, consequently acting to prevent the rotation of the electrode terminal member 5 more effectively.

Further stated more specifically, the flange 51 of the electrode terminal member 5 is provided with an outer peripheral wall having a cylindrical face partly replaced by planar faces, and the insulating seal member 6 is provided with an engaging recessed portion 62 for the outer peripheral wall of the flange 51 of the electrode terminal member 5 to engage in nonrotatably relative thereto, the engaging recessed portion 62 having an inner peripheral wall providing the other of said two peripheral walls of the seal member 6. The flange 51 of the terminal member 5 and the engaging recessed portion 62 of the insulating seal member 6 are then easy to make, while the rotation of the terminal member 5 can be reliably prevented when the terminal member 5 is to be fixed.

Further stated more specifically, the flange 51 of the electrode terminal member 5 is provided with an outer peripheral wall having at least one corner portion formed by the intersection of a plane with another plane, and the insulating seal member 6 is provided with an engaging recessed portion 62 for the outer peripheral wall of the flange 51 of the electrode terminal member 5 to engage in nonrotatably relative thereto, the engaging recessed portion 62 having an inner peripheral wall providing said other peripheral wall. The corner portion on the flange 51 of the terminal member 5 is then effectively engaged in the recessed portion 62 of the insulating seal portion 6, whereby the terminal member 5 is reliably prevented from rotating relative to the seal member 6. Consequently, the rotation of the terminal member 5 can be reliably prevented when the terminal member 5 is fixed.

Thus, the secondary cell of the present invention is so adapted that the electrode terminal member 5 can be prevented from rotating with the nut 7 when the electrode terminal assembly is fixed to the lid 12, without entailing any increase in the number of components or the number of manufacturing steps.

DETAILED DESCRIPTION OF EMBODIMENTS

Figure 1:
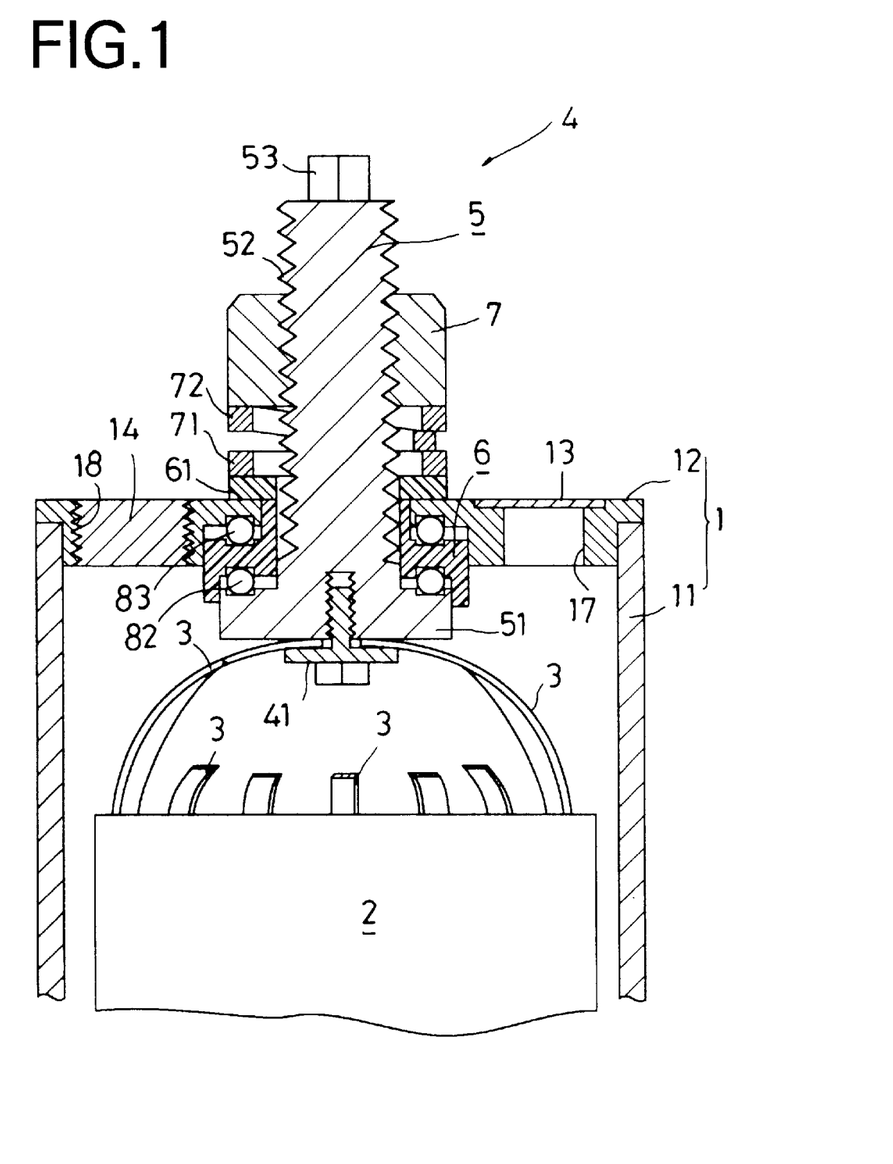
FIG. 1 is a fragmentary sectional view of a cylindrical lithium ion secondary cell embodying the invention.

Cylindrical lithium ion secondary cells embodying the present invention will be described below in detail with reference to the drawings. With reference to FIG. 1, the secondary cell of the invention comprises a cylindrical aluminum cell can 1 including a cylinder 11 and lids 12 welded to opposite opening portions of the cylinder, and a rolled-up electrode unit 2 accommodated in the cell can 1. The cell can 1 is 57 mm in outside diameter and 220 mm in length. The rolled-up electrode unit 2 has the same construction as the conventional one shown in FIG. 6 and therefore will not be described again.

An electrode terminal assembly 4 is attached to each lid 12 constituting the cell can 1. As in the prior art, the lid 12 has a screw plug 14 screwed in and closing a threaded bore 18 for pouring an electrolyte into the cell can 1 therethrough and a gas vent valve 13 closing a gas vent 17.

A plurality of current collector tabs 3 of the same polarity extending from the rolled-up electrode unit 2 have outer ends connected to the electrode terminal assembly 4. For the sake of convenience, FIG. 1 shows only some of the electrode tabs as connected at their outer ends to the terminal assembly 4, with the connection of the other tab outer ends to the assembly 4 omitted from the illustration.

Figure 2:
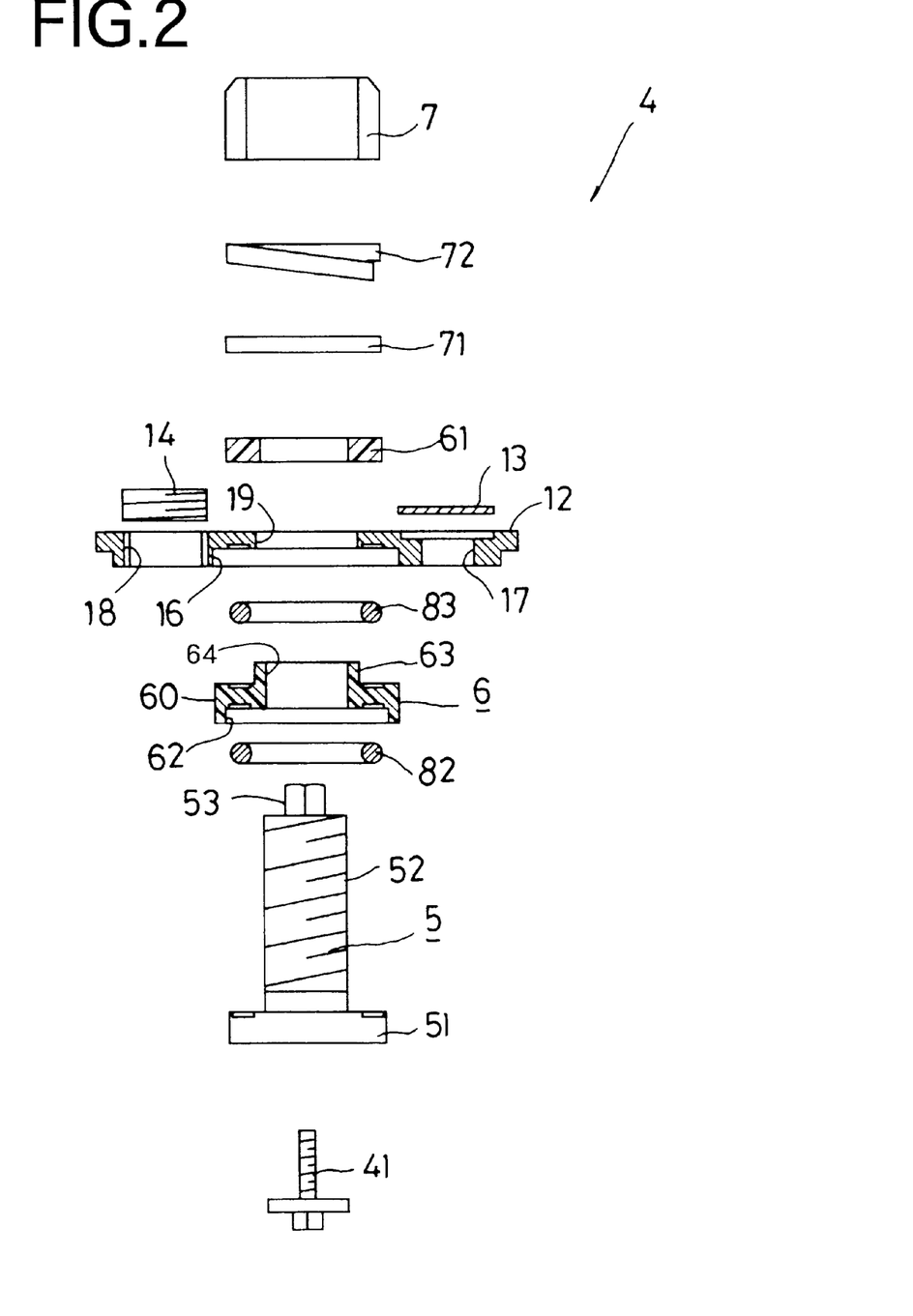
FIG. 2 is an exploded front view partly broken away and showing an electrode terminal assembly.

As shown in FIGS. 1 and 2, the electrode terminal assembly 4 comprises an electrode terminal member 5 extending through a center hole 19 in the lid 12 and attached to the lid 12. The terminal member 5 comprises a screw shank 52 extending through the center hole 19 of the lid 12, a flange 51 formed at a base end of the shank 52 and projecting into the can 1, and a square projection 53 at an outer end of the shank projecting outward from the cell can 1. A tubular insulating seal member 6 is fitted in the center hole 19 of the lid 12, while a disklike insulating seal member 61 is provided along the opening edge of the hole 19. O-rings 82, 83 are interposed between opposed faces of the tubular insulating seal member 6 and the flange 51 of the terminal member 5 and between opposed faces of the tubular insulating seal member 6 and the lid 12 to provide electrical insulation and a seal between the lid 12 and the terminal member 5.

The electrode terminal member 5 of the positive electrode terminal assembly 4 is made of aluminum, while the terminal member 5 of the negative electrode terminal assembly 4 is made of nickel. In either of the terminal assemblies 4, the insulating seal members 6, 61 are made of polypropylene, and the O-rings 82, 83 are made of fluorocarbon resin.

A washer 71 and a spring washer 72 are provided around the shank 52 of the electrode terminal member 5 from outside the lid 12, and a nut 7 is screwed on the shank 52. The seal members 6, 61 and the O-rings 82 83 are clamped between the flange 51 of the terminal member 5 and the washer 71 by tightening up the nut 7 to produce an enhanced sealing effect. A tab connecting screw member 41 is screwed in the flange 51 of the terminal member 5. The outer ends of the current collector tabs 3 extending from the rolled-up electrode unit 2 are held between the flange 51 and the screw member 41.

Figure 3A:
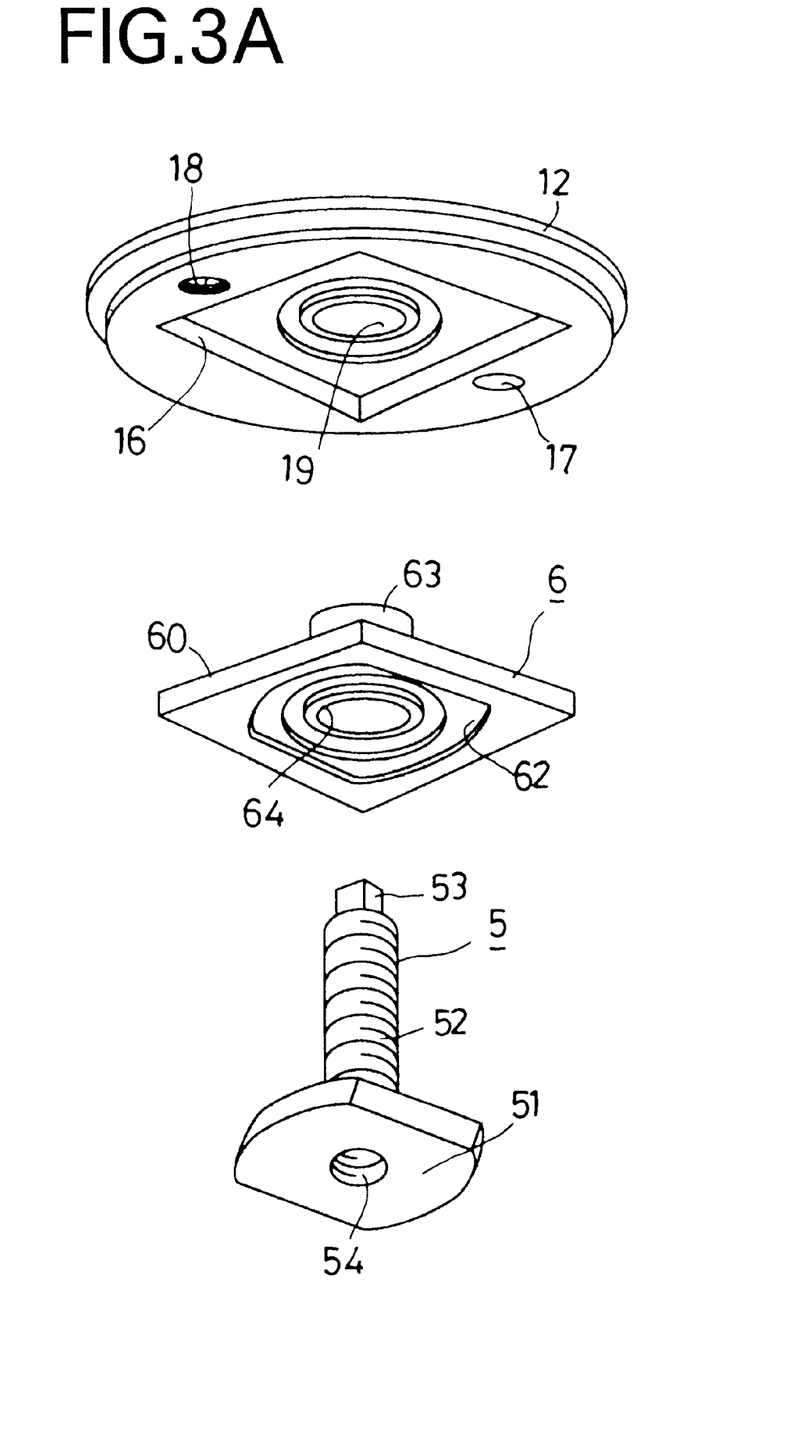
FIG. 3A is an exploded perspective view of a lid, insulating seal member and electrode terminal member.

With reference to FIG. 3A, the insulating seal member 6 of the electrode terminal assembly 4 comprises a rectangular plate body 60, and a cylindrical portion 63 having a center bore 64 and upwardly projecting from the plate body 60 centrally thereof. The plate body 60 has an engaging recessed portion 62 resembling an ellipse, formed in the rear side thereof and having an inner periphery in the form of a cylindrical face partly replaced by planar faces. On the other hand, formed in the rear side of the lid 12 is a rectangular engaging recessed portion 16 which is centered about the center hole 19 and in which the plate body 60 of the insulating seal member 6 is engageable. The flange 51 of the terminal member 5 has a contour resembling an ellipse so as to be engageable in the recessed portion 62 formed in the plate body 60 of the seal member 6.

In rotating the nut 7 for tightening up after the electrode terminal assembly 4 has been attached to the lid 12 as seen in FIG. 1, the torque of the nut 7 is delivered to the electrode terminal member 5. Because the flange 51 of the terminal member 5 is in engagement with the insulating seal member 6 and nonrotatable relative thereto and further because the seal member 6 is in engagement with the lid 12 and nonrotatable relative thereto, the terminal member 5 is prevented from rotating. In this way, the terminal member 5 is prevented from rotating with the nut 7 being tightened up, so that sufficient tightening torque can be given to the nut 7 to result in reduced contact resistance.

The cylindrical lithium ion secondary cell of the invention has the lid 12, insulating seal member 6 and electrode terminal member 5 which are shown in FIGS. 1 to 3A, in place of the lid 12, insulating seal member 8 and electrode terminal member 9 which are incorporated in the cylindrical lithium ion secondary cell of the prior art shown in FIG. 5. According to the present invention, the rotation of the terminal member 5 is prevented by forming the rectangular recessed portion 16 in the lid 12, the elliptical flange 51 on the terminal member 5, and the rectangular plate body 60 and recessed portion 62 in the insulating seal member 6. This results in no increase in the number of components or the number of manufacturing steps. Moreover, the cylindrical lithium ion secondary cell of the invention can be assembled easily by exactly the same process as in the prior art.

Figure 3B:
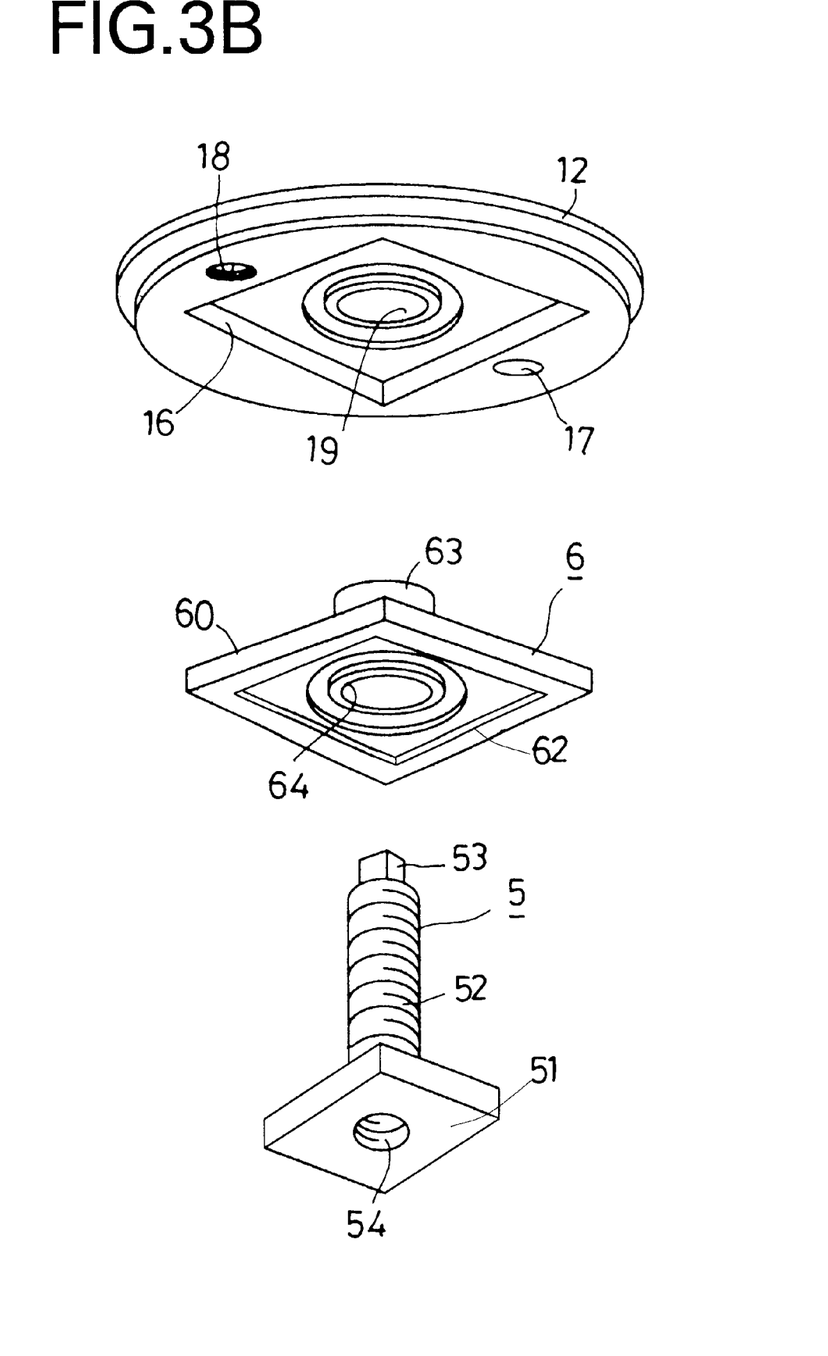
FIG. 3B is an exploded perspective view of a lid, insulating seal member and electrode terminal member according to another embodiment.

The engaging structure of lid 12, seal member 6 and terminal member 5 shown in FIG. 3A is not limitative; also usable is, for example, the engaging structure shown in FIG. 3B. With reference to FIG. 3B, the insulating seal member 6 comprises a rectangular plate body 60, and a cylindrical portion 63 having a center bore 64 and projecting upward from the plate body 60 centrally thereof. A rectangular engaging recessed portion 62 is formed in the rear side of the plate body 60. The flange 51 of the electrode terminal member 5 has a contour resembling a rectangular plate so as to be engageable in the recessed portion 62 formed in the plate body 60 of the seal member 6. Like the engaging arrangement shown in FIG. 3A, this engaging arrangement is also effective for preventing the terminal member 5 from rotating with the nut 7.

To substantiate the effect of the electrode terminal assembly 4 of the invention for preventing the rotation of the terminal member 5, the cell of the invention shown in FIG. 1 and the conventional cell shown in FIG. 5 were assembled by tightening up the nut 7 for the invention cell of FIG. 1 with torque of 80 kgf·cm by a torque wrench, and tightening up the nut 7 for the conventional cell of FIG. 5 by a torque wrench until the electrode terminal member 9 started to rotate with the nut. The final tightening-up torque for the conventional cell was 40 kgf·cm.

Figure 4:
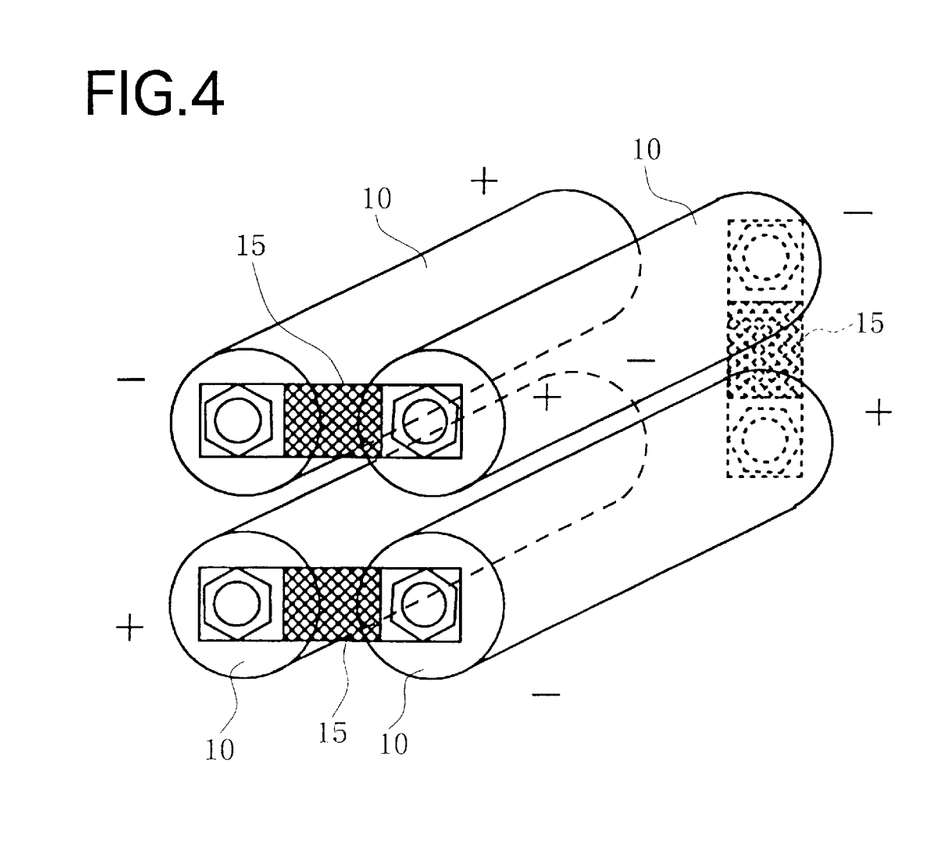
FIG. 4 is a perspective view of a module battery.

Module batteries comprising four cells 10 as shown in FIG. 4 were each assembled using cells of the invention or conventional cells fabricated in this way. The four cells 10 were connected to one another in series using connectors 15 as held between the spring washer 72 and the nut 7. The module battery of the invention and the module battery of the prior art were checked for resistance value by a 1-kHz a.c. ohmmeter.

The module battery of the invention was 9.3 mΩ in resistance value, while the module battery of the prior art was 15.6 mΩ in resistance value. This difference can be explained as follows. With the cell of the invention, the terminal member 5 is in engagement with the lid 12 nonrotatably relative thereto, so that sufficient tightening-up torque can be given to result in reduced contact resistance, whereas with the conventional cell wherein the terminal member 9 rotates with the nut, it is impossible to give sufficient tightening-up torque to result in increased contact resistance.

The cell of the invention is not limited to the foregoing embodiments in construction but can be modified variously by one skilled in the art without departing from the spirit of the invention as set forth in the appended claims. For example, seal packing sheets are usable in place of the O-rings 82, 83. The means of engagement between the lid 12 and the insulating seal member 6, and the means of engagement between the seal member 6 and the electrode terminal member 5 are not limited to the rectangular or elliptical structure shown in FIG. 3A or 3B, but it is possible to use engaging means including a pair engageable faces of various shapes insofar as these faces are engageable nonrotatably relative to each other.

What is claimed is:

1. A secondary cell comprising an electrode unit (2) enclosed in a cell can (1) and serving as a cell element and adapted to deliver electric power generated by the electrode unit (2) to the outside via a pair of electrode terminal portions, the secondary cell wherein at least one of the electrode terminal portions is provided by an electrode terminal assembly (4) attached to the cell can (1), the electrode terminal assembly (4) comprising:

an electrode terminal member (5) extending through a center hole (19) formed in the cell can (1) and having a flange (51) projecting into the cell can (1) and a screw shank (52) projecting outward from the cell can (1), an insulating seal member (6) provided in the center hole (19) of the cell can (1) around the screw shank (52) of the electrode terminal member (5) for providing electrical insulation and a seal between the cell can (1) and the electrode terminal member (5), and a nut (7) screwed on the screw shank (52) of the electrode terminal member (5) from outside the cell can (1), the insulating seal member (6) being in engagement with the cell can (1) and the flange (51) of the electrode terminal member (5) and nonrotatable relative to the cell can and the flange.

2. A secondary cell according to claim 1 wherein the engaging portions of the insulating seal member (6) and each of the cell can (1) and the flange (51) of the electrode terminal member (5) are provided with a pair of engaging faces in engagement with each other nonrotatably.

3. A secondary cell according to claim 1 wherein the insulating seal member (6) is provided with a center bore (64) having the screw shank (52) of the electrode terminal member (5) inserted therethrough, and has two peripheral walls formed around the center bore (64) and each varying in radial distance from a center of the center bore (64) along the direction of periphery of the wall, the cell can (1) having a peripheral wall in engagement with one of the peripheral walls of the insulating seal member (6) nonrotatably relative thereto, the flange (51) of the electrode terminal member (5) having a peripheral wall in engagement with the other peripheral wall of the insulating seal member (6) nonrotatably relative thereto.

4. A secondary cell according to claim 3 wherein the insulating seal member (6) comprises a plate body (60), and the plate body (60) has an outer peripheral wall provided with at least one corner portion formed by the intersection of a plane with another plane, the outer peripheral wall providing said one of the peripheral walls of the insulating seal member (6).

5. A secondary cell according to claim 3 wherein the flange (51) of the electrode terminal member (5) is provided with an outer peripheral wall having a cylindrical face partly replaced by planar faces, and the insulating seal member (6) is provided with an engaging recessed portion (62) for the outer peripheral wall of the flange (51) of the electrode terminal member (5) to engage in nonrotatably relative thereto, the engaging recessed portion (62) having an inner peripheral wall providing said other peripheral wall of the insulating seal member (6).

6. A secondary cell according to claim 3 wherein the flange (51) of the electrode terminal member (5) is provided with an outer peripheral wall having at least one corner portion formed by the intersection of a plane with another plane, and the insulating seal member (6) is provided with an engaging recessed portion (62) for the outer peripheral wall of the flange (51) of the electrode terminal member (5) to engage in nonrotatably relative thereto, the engaging recessed portion (62) having an inner peripheral wall providing said other peripheral wall of the insulating seal member (6).

7. A secondary cell according to claim 2 wherein the insulating seal member (6) is provided with a center bore (64) having the screw shank (52) of the electrode terminal member (5) inserted therethrough, and has two peripheral walls formed around the center bore (64) and each varying in radial distance from a center of the center bore (64) along the direction of periphery of the wall, the cell can (1) having a peripheral wall in engagement with one of the peripheral walls of the insulating seal member (6) nonrotatably relative thereto, the flange (51) of the electrode terminal member (5) having a peripheral wall in engagement with the other peripheral wall of the insulating seal member (6) nonrotatably relative thereto.

8. A secondary cell according to claim 7 wherein the insulating seal member (6) comprises a plate body (60), and the plate body (60) has an outer peripheral wall provided with at least one corner portion formed by the intersection of a plane with another plane, the outer peripheral wall providing said one of the peripheral walls of the insulating seal member (6).

9. A secondary cell according to claim 7 wherein the flange (51) of the electrode terminal member (5) is provided with an outer peripheral wall having a cylindrical face partly replaced by planar faces, and the insulating seal member (6) is provided with an engaging recessed portion (62) for the outer peripheral wall of the flange (51) of the electrode terminal member (5) to engage in nonrotatably relative thereto, the engaging recessed portion (62) having an inner peripheral wall providing said other peripheral wall of the insulating seal member (6).

10. A secondary cell according to claim 7 wherein the flange (51) of the electrode terminal member (5) is provided with an outer peripheral wall having at least one corner portion formed by the intersection of a plane with another plane, and the insulating seal member (6) is provided with an engaging recessed portion (62) for the outer peripheral wall of the flange (51) of the electrode terminal member (5) to engage in nonrotatably relative thereto, the engaging recessed portion (62) having an inner peripheral wall providing said other peripheral wall of the insulating seal member (6).

* * * * *